United States Patent
Fang

(10) Patent No.: US 8,933,184 B2
(45) Date of Patent: Jan. 13, 2015

(54) SYNTHESIS METHOD OF POLYCARBOXYLIC ACID WATER-REDUCING AGENT

(75) Inventor: Jian Fang, Shanghai (CN)

(73) Assignee: Shanghai Taijie Chemical Co., Ltd., Shanghai (CN)

( * ) Notice: Subject to any disclaimer, the term of this patent is extended or adjusted under 35 U.S.C. 154(b) by 0 days.

(21) Appl. No.: 13/637,626

(22) PCT Filed: Oct. 29, 2010

(86) PCT No.: PCT/CN2010/001727
§ 371 (c)(1),
(2), (4) Date: Sep. 26, 2012

(87) PCT Pub. No.: WO2012/012923
PCT Pub. Date: Feb. 2, 2012

(65) Prior Publication Data
US 2013/0172505 A1   Jul. 4, 2013

(30) Foreign Application Priority Data

Jul. 27, 2010 (CN) .......................... 2010 1 0238255

(51) Int. Cl.
*C08F 22/20* (2006.01)
*C08F 20/68* (2006.01)

(52) U.S. Cl.
USPC .......................................................... 526/312

(58) Field of Classification Search
USPC ....................................... 526/312, 318.5, 320
See application file for complete search history.

(56) References Cited

U.S. PATENT DOCUMENTS

2007/0049710 A1 * 3/2007 Kozuki et al. ................... 526/68

FOREIGN PATENT DOCUMENTS

| | | |
|---|---|---|
| CN | 101575403 A | 11/2009 |
| CN | 101775107 A | 7/2010 |
| JP | 2009161621 A | 7/2009 |
| WO | WO2008032799 A | 3/2008 |

* cited by examiner

*Primary Examiner* — Robert D. Harlan
(74) *Attorney, Agent, or Firm* — Ming Chow; Sinorica, LLC

(57) ABSTRACT

A method for synthesizing concrete polycarboxylic acid water-reducing agent at room temperature under non-stirring situation is disclosed, which comprises dissolving reactive materials, initiator, chain transfer agent and promoter into a solvent, reacting on standing at 0-50° C.; then adding neutralizing agent at the end of reaction. The method makes use of oxidation-reduction system reacting at low temperature, and can adapt to a variety of reactive material monomers. It does not need to control feeding speed or provide extra heating, does not need to stir during the reaction, and remarkably simplifies operation steps in traditional process, which makes it possible to not only produce in large scale, but also produce in small scale in concrete construction site at any moment.

19 Claims, No Drawings

SYNTHESIS METHOD OF POLYCARBOXYLIC ACID WATER-REDUCING AGENT

FIELD OF THE INVENTION

This invention relates to a producing method of superplasticizer, and in particular to a producing method of polycarboxylic acid water-reducing agent with low equipment requirement, simple operation and low energy consumption.

BACKGROUND OF THE INVENTION

The concrete water-reducing agent (also named superplasticizer) is an additive which can reduce the using amount of mixing water and increase the strength of the concrete in case of remaining the workability of concrete and the using amount of cement. The water-reducing agent can destruct the flocculated structure of the cement particles because of its surface activity, complexation, electrostatic repulsion, or steric repulsion, so that the workability and strength of the concrete is remaining in case of reducing the amount of the cement. The mechanism of the water-reducing agent is:

1) Dispersion: When the cement is mixed with water, because of the molecular attraction between cement particles, the cement slurry flocculates, so 1030% of the mixing water is enclosed in the flocculation, and loses free flow and lubrication. As a result, the fluidity is reduced. When the water-reducing agent is added, there are same electric charges (negative charges usually) on the surface of the cement particles, because of the oriented adsorption of the water-reducing agent molecule to the surface of the cement particles to generate the electrostatic repulsion which can force the particles to disperse. Thus, destruct the flocculation is destroyed and some water enclosed in the flocculation is released to flowing, so that the fluidity of the concrete increases.

2) Lubrication: Because of strong polarity of its hydrophilic groups, the water-reducing agent adsorbs to the surface of the cement particles and forms a stable solvate water membrane with water molecules. The membrane has excellent lubricity, and can reduce the slide resistance between the cement particles, so that it can increase the concrete's fluidity.

3) Steric repulsion: The hydrophilic branched chains consisted by polyether in the structure of the water-reducing agent molecule stretch in the solvent, and form a steric and hydrophilic adsorption layer on the surface of the cement particle which is adsorbed by the water-reducing agent. When different cement particles approach, these layers overlap, and the steric repulsion is produced between the cement particles. The more layers overlap, the more strong steric repulsion and stronger impediment to coacervation between cement particles, so that the excellent slump of the concrete remains.

4) Delayed-release action of the branched chains in graft copolymer: During the producing of the water-reducing agent, such as polycarboxylic acid water-reducing agent, branched chains are grafted into the molecular chain of the v, wherein the branched chains do note play a role in steric repulsion, but also can release polycarboxylic acid, which promotes dispersion, due to the breaking of the branched chains, so that the dispersion effect of cement particles is increased, and the loss of the slump is controlled.

Based on the composition, the conventional water-reducing agent are divided into lignosulfonic water-reducing agent, polycyclic aromatic water-reducing agent and water-soluble resin sulfonate water-reducing agent, such as the aliphatic high-activity modified by water-reducing agent lignosulfonate disclosed in Patent CN101665337A, the concrete water-reducing agent which is a polycyclic aromatic sulfonate polymer disclosed in Patent CN101007719A, the aliphatic concrete water-reducing agent disclosed in Patent CN101575186A, and the amidosulphonate concrete water-reducing agent disclosed in Patent CN101723615A, and so on. Wherein, the conventional high-activity water-reducing agent mainly includes naphthalene sulphonate-formaldehyde condensation polymer (NSF) and melamine sulphonate-formaldehyde condensation polymer (MSF). They have high water reducing ratio, however, these water-reducing agents cannot be used for preparing high-performance or superior-performance concrete, because of the quickly loss of slump and bad permanency of the concrete when using these water-reducing agents.

Compared with the water-reducing agents above, polycarboxylic acid water-reducing agent, which is the combination product with graft multicomponent polymer of carboxylic and other available auxiliaries, is high-tech and has good combination property, such as high water reduction rate, significant enhancement effect, excellent workability of concrete, non-affection to elastic modulus of concrete, and low gradual loss when mild collapse occurs, therefore, the polycarboxylic acid water-reducing agent is widely used recently.

The excellent performance of polycarboxylic acid water-reducing agent depends on its specific molecular structure: there are many active groups, for example, $-SO_3H$, $-COOH$, $-OH$, etc., at the main chain of the comb molecular structure, and the side chain is long polyoxylalkyl alkenyl group, for example, $-(CH_2CH_2O)m-R$, etc. The different groups results different effects to the dispersion of the cement, and usually it is considered that the electronegative sulfonic groups and carboxyl groups results anchoring and electrostatic repulsion when absorbed onto the surface of the cement particles. When stretch in the solvent, the long side chain has the strong steric repulsion which is promote dispersion of the cement particles more effectively and is more insensitive than electrostatic repulsion. So the polycarboxylic acid water-reducing agent has more effective dispersion effect and well adaptability to different cement.

In 1980s, polycarboxylic acid water-reducing agent was invented and used in project, and achieve the favorable economic benefits. The polycarboxylic acid water-reducing agent invented in Japan in 1980s is completely different from NSF and MSF. It can remain the high fluidity of the concrete when low additive amount, and can result in low viscosity and slump remaining when low water-cement ratio, and has great compatibility with various cements. So it is an indispensable component to high strength and fluidity concrete. As the needs of high strength and performance concrete, and the development of the theory of polymer chemistry and material molecular design, the demands of water-reducing agents will get more pressing. The research direction has turned to polycarboxylic acid water-reducing agent from NSF and MSF, and the polycarboxylic acid water-reducing agent has been an important component in the concrete.

The most using polycarboxylic acid water-reducing agent at present are: 1) Ester type water-reducing agent is that synthesized by two-steps method, wherein, methoxypolyethylene glycol (MPEG) and excessive methacrylic acid (or acrylic acid, maleic anhydride or itaconic acid) esterifies, and then at a temperature, dropping the aqueous solution of peroxide and aqueous solution of MPEG ester at the same time, with water as solvent and substrate. 2) Ether type water-reducing agent that is synthesized by unsaturated polyether as raw material, and unsaturated alcohol polyether and $H_2O$ (adding other monomer containing active double bond some times) as substrate, by the steps: adding peroxide as initiator, at a temperature, dropping aqueous solution of chain transfer agent and aqueous solution of comonomer containing active double bond together to copolymerization, preserving heat for aging in a period, and cooling down and neutralizing to obtain the product. The two water-reducing agents apply to different cements and each of them has advantages and disadvantages, and some times they must be used together. The two methods have a common point that is the necessary of the preservation heat and dropping active monomer when polymerizing, and continuously stirring during the dropping to mix the reactants uniformly.

Patent CN101215119A disclosed a method for synthesis of polycarboxylic acid water-reducing agent, wherein, water and alkylene polyether are added as substrate, the heated to reaction temperature, then peroxide initiator is added, and dropping comonomers and chain transfer agent to synthesize the high-performance polycarboxylic acid water-reducing agent. This one-step method is simpler than the two-steps method, however, it need large investment and strictly controlling of the process of dropping comonomers and chain transfer agent, and the consumption of energy is high because of the necessary of the heat preservation.

Patent CN101708974A disclosed a preparing method of polycarboxylic acid water-reducing agent, wherein, feeding nitrogen into solvent and heating to 70° C., dropping monomers solution and initiator solution simultaneously, and then heating to 85° C. to polymerization.

Patent CN101486783A disclosed a preparing method of polyether grafted water-reducing agent, wherein, heating to esterification in nitrogen atmosphere, and controlling the temperature at 80~110° C. when copolymerizing, then heating to 120~160° C. and adding sulfonating agent to sulfonattion at a high temperature. However, it is difficult to control the reaction because of excessive steps and the requirement of all the reactions at high temperature.

Patent CN101492518A disclosed a technique for preparing ether type water-reducing agent. At 60~120° C., dropping initiator and the mixed solution of acrylic acid and 2-hydroxyethyl acrylate, then preserving heat to react.

Patent CN101024566A disclosed a technique for preparing water-reducing agent. Polyethylene glycol monomethyl ether, methacrylic acid, toluene-p-sulfonic acid and p-benzenediol are added at 80~140° C. to react for 4~6 hours, and then adding allyl sulfonate at 60° C., and adding initiator to polymerization at 65~95° C. The process of this method is more complex and it is difficult to control the react temperature.

Patent CN101050083A disclosed a preparing method of polycarboxylic acid water-reducing agent r. The air in reactor is replaced by inert gas, $H_2O$ and allyl sulfonate are added. Heating to 55~80° C. in water bath, and dropping initiator and the mixed solution of monomers simultaneously. The process of the dropping remains for 1~2 hours. Heating to 80~90° C. to react.

The methods above have some flaws such as large investment of producing equipment, specialized producing equipment, complex process, high energy consumption, tremendous requirement of manpower resources, etc. It will be save tremendous manpower and material resources if the technique of polymerization is improved to simplify the steps. Furthermore, there will be a long distance between construction sites in many major engineering, such as motorway or railway construction, because of the frequent transfer of construction site during the construction. It must increase the transportation cost to transport water-reducing agent (containing more than 60% $H_2O$ in the product) that produced in stationary factory to the construction site. Although, some factories can be built along the line of construction, but it will be a large investment, and the construction may be completed before the building of the factories. If the water-reducing agent is produced at the construction site with simple technique and equipment, by the raw material transported to the site, it will be decrease the investment and save transfer and producing cost.

DESCRIPTION OF THE INVENTION

The synthesis of polycarboxylic acid water-reducing agent is a polymerization process and it needs heating to initiate the initiator into free radical. If the initiator can't be dispersed and the heat generated during the polymerization can't be removed quickly, the implosion which is very danger will occur. To prevent the implosion happening, the method of dropping monomers and initiators is used, however, this method wastes time and energy, and needs complicatedly special equipment.

The present invention provides a producing method of polycarboxylic acid water-reducing agent at low temperature using redox system. It is independent of temperature and slowly dropping the raw materials, so that the operation of conventional is simplified, and the product can achieve the same properties.

The producing method of polycarboxylic acid water-reducing agent includes the following steps:

step1, the initiator and the monomers are dissolved in a solvent, and then are kept standing for polymerizing at 0~50° C., or the polymerization can be carried out under stirring condition;

step2, neutralizing by adding neutralizer to ending the reaction.

Wherein, the monomers include unsaturated reactants with long-chain or short-chain, and the reactants with long-chain or short-chain will be matched properly when polymerizing.

First, the monomer with unsaturated long-chain, such as unsaturated polyether (or unsaturated ester) containing double bond, and water (or other solvent) are added proportionally to reactor, stirring to be dissolved. It should be stirred sufficiency to dissolve or be preheated to melt if the reactant is plate or other solid state. The long-chain monomer can be one type or a mixture of some types of monomers, or a mixture of some types of monomers with different molecular weights.

Then the monomer with unsaturated short-chain, chain transfer agent and accelerant are added, stirring to blending. The short-chain monomer can be one type of or a mixture of some types of monomers, the chain transfer agent or the accelerant can be one type reagent of a mixture of some types of reagents. And it needn't to add accelerant when using some reactant.

A redox system is formed when the initiator is added, and reaction is initiated. The temperature of the reaction system will rise because of the heat generated during polymerization, and then keeping it standing to react. The reaction time can be adjusted according to the activity of the reactants or the temperature of the environment. When the external temperature is low, such as in winner, the standing time should be lengthened, and when the external temperature is high, such as in summer, the standing time should be shortened. Furthermore, the high activity will be obtained due to the adjusting of the redox system, for example, when highly active reactant such as ester containing double bond is used, the standing time will be 6 hours to ensure a full reaction, and when lowly active reactant such as unsaturated polyether is used, the standing time will be 20~30 hours or more if the temperature is low to ensure a full reaction. Therefore, if the standing time is too long, such as more than 20 hours, some initiator can be added again when standing for some time.

In the last step, adding neutralizer, such as alkaline liquor that is the common neutralizer, and stirring to neutralization to get the product, wherein, a part of neutralizer can be added during the polymerization. Caustic soda or organic amine can be used to neutralization in order to get high concentration of the product. The concentration of the produced polycarboxylic acid water-reducing agent can be adjusted according to the requirement of the users, for example, an acceptable concentration among the extent of 5~80%.

In some particular cases that the polycarboxylic acid water-reducing agent is produced in solvent, the solvent can be removed by solvent-removing equipment after the reaction to obtain a high-performance polycarboxylic acid water-reducing agent. The concentration of the produced polycarboxylic acid water-reducing agent can be adjusted according to the requirement of the users, for example, an acceptable concentration within the extent of 5~80%

Generally, the reactants except initiator and neutralizer can be added together into a reactor, and it needn't to consider the feed order because the added reactants can't react or react slowly. After the added reactants are stirred to blending, then the initiator is added, stirring to blending again, and then keeping it standing to reaction. Or, all the reactants except neutralizer can be added together into a reactor if the reaction equipment and site condition have an ability of quickly feeding, and the polycarboxylic acid water-reducing agent is obtained by stirring to blending, keeping it standing to reaction for some time, and then neutralizing. Generally, the neutralizer is added at the end of the polymerization; however it can be added during the polymerization also under the condition of that the pH value is controlled fewer than 6, because the half-life of free radical will be shorten and the reactants will react incompletely if the pH value is too high.

The solvent can be one or more of water, alcohol, aromatic hydrocarbon, aliphatic hydrocarbon, ester, or ketone. The neutralizer can be one or more of metal hydroxide, organic amine, or inorganic ammonia, and preferably is one or more of sodium hydroxide, potassium hydroxide, aqueous ammonia, ethanolamine, triethanolamine.

The chain transfer agent can be one of more of mercaptan, halide, or unsaturated hydrocarbon, and preferably is one or more of mercaptoacetic acid, mercaptoethanol, thioglycerol, thiohydroxyacetic acid, mercaptopropionic acid, 2-mercapto-propionic acid, thiomalic acid, 3-mercapto-propionic acid, 2-mercapto-ethyl sulfonic acid, butanethiol, octyl mercaptan, decyl mercaptan, lauryl mercaptan, hexadecyl mercaptan, octadecyl mercaptan, hexamethylene mercaptan, triophenol, octyl thiohydroxyacetate, octyl 2-mercaptopropionate, octyl 3-mercaptopropionate, 2-ethyl-hexyl mercaptopropionate, 2-mercapto-ethyl caprilate, 1,8-dimercapto-3,6-dioxo-octane, tri-thiol decane, tetrachloromethane, tetrabromomethane, trichloromethane, dichloromethane, bromo-trichloromethane, tribromomethane, α-terpinene, γ-terpinene, dipentene, or terpinolene.

The accelerant used can be one or more of reductant, organic amine, organic acid, alcohol, ketone, ester, ether, phenol, phosphide or organic phosphine, and preferably is one or more of sodium bisulfite, sodium sulfite, ferrous sulfate, sodium thiosulfate, Mohr's salt, sodium metabisulfite, sodium hydrosulfite, sodium formaldehyde sulfoxylate, ascorbic acid, sodium ascorbate, phosphoric acid or phosphate salt, phosphorous acid or phosphate salt, hypophosphorous acid or hypophosphite salt, ethanediamine, sodium ethylene diamine tetracetate, phenothiazine, hydroxyethylidenediphosphonic acid, amino trimethylene phosphonic acid, polyamino polyether methylene phosphonate, hexamethylendiamino tetramethylene phosphonic acid, glycine, lactic acid, 2-hydroxyl-phosphono-acetic acid, poly (aspartic acid), polyepoxysuccinic acid, phytic acid, 2-amino-1-propanol, 2-amino-1,3-ropanediol, isopropanol, turpentine, cyclohexanone, p-hydroxylbenzoic acid, p-(t-butyl)-phenyl methyl ether, 2,6-di(t-butyl)-p-cresol, p-hydroxylphenyl methyl ether, 2,5-di(t-butyl)-p-benzenediol, p-benzenediol, p-(t-butyl)-o-dihydroxybenzene, or (t-butyl)-p-benzenediol.

The initiator can be one or more of peroxide, persulfide or azoic compound, and preferably can be one or more of sodium persulfate, potassium persulfate, ammonium persulfate, hydrogen peroxide, benzoyl peroxide, lauroyl peroxide, cumene hydroperoxide, azo-di(2-methyl)-propanamide hydrochloride, 2,2'-azo-di(2-methyl-propanamide)-oxime salt, azobisisobutyronitrile or azobisisobutyroamidine hydrochlorate.

The chain of the polycarboxylic acid water-reducing agent has a comb-like structure composing of "comb dents" that are the side chains synthesized by hydrophilic long-chain monomer containing unsaturated group at one end, and "comb backbone" that is the main chain synthesized by short-chain monomer containing unsaturated group. So the monomers used for producing the polycarboxylic acid water-reducing agent can be divided for the monomers containing unsaturated long-chain and monomers containing unsaturated short-chain, and the monomers suitable to be used for producing the polycarboxylic acid water-reducing agent of the present invention will be described in the following.

Wherein, the monomers are compounds containing unsaturated group, and they can be one or more of unsaturated polyether, unsaturated carboxylic acid or the salt thereof, unsaturated carboxylate ester, unsaturated amine, unsaturated amide, sulphonate containing unsaturated group, or olefine.

1) Unsaturated Polyether:

The molecular structure of the unsaturated polyether is:

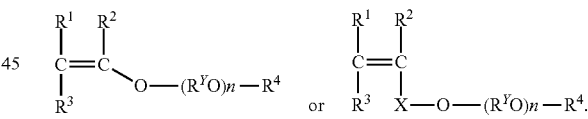

Wherein, $R^1$, $R^2$, or $R^3$ can be H or alkyl, $R^4$ can be H or hydrocarbyl of C1~C20, $R^Y$ can be an alkenyl of C2~C18, n can be an integer among 1~300, and X can be divalence chain olefin of C1~C5.

The systemization of the unsaturated polyether is: the alcohol containing unsaturated bond react with the monomer of oxyalkylene at the present of catalyst, and the product is terminated by hydroxyl, alkyl, or alkenyl.

Wherein, the alcohol containing unsaturated bond can be vinyl alcohol, butynol, decynediol, or the alcohol containing the following structure:

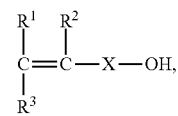

Wherein, the alcohol preferably is allyl alcohol, methyl-allyl alcohol, 1,2-dimethytl-2-propen-1-ol, 1-methyl-1-buten-1-ol, 2-methyl-3-buten-1-ol, 2-methyl-2-buten-1-ol, 3-methyl-3-buten-1-ol, 5-hexen-1-ol, heptenol, or nonenol.

The —$(R^YO)_n$— is obtained by a addition reaction that can be the random addition, alternat addition, or block addition, by one or more types of oxyalkylenes containing the following structure:

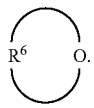

Wherein, $R^6$ can be alkyl with or without branched chain. And preferably, the oxyalkylene can be ethylene epoxide, propylene epoxide, 1,4-epoxybutane, isobutylene oxide, 1,2-epoxybutane, or 2,3-epoxybutane.

2) Unsaturated Carboxylic Acid or its Salt:

The unsaturated carboxylic acid or its salt can be fatty acid of C2~C20, polybasic acid of C2~C20, or acid anhydride of C2~C20 or their salts. Preferably, the unsaturated carboxylic acid or its salt can be acrylic acid, methacrylic acid, butenic acid, iso-butenic acid, hexenic acid, phenyl acrylic acid, sorbic acid, maleic acid, maleic anhydride, fumaric acid, itaconic acid, pentendioic acid, or citric acid, and their metal salt, ammonium salt, or amine salt, such as triethanolamine acrylate, triethanolamine methacrylate.

3) Unsaturated Ester:

The unsaturated ester is total ester or hemi-ester synthesized by unsaturated carboxylic acid containing one or more carboxyls, and alcohol which is single-alcohol or polybasic alcohol, or polyether with structural formula of $R^9$-T-$(R^ZO)_kH$; wherein, $R^9$ is H or hydrocarbonyl of C1~C20, T is N, O, or OO, $R^ZO$ is the random, alternat, or block addition product by one or more type of oxyalkylene, k is an integer among 1~300. Preferably, the oxyalkylene is ethylene epoxide, propylene epoxide, 1,4-epoxybutane, isobutylene oxide, 1,2-epoxybutane, or 2,3-epoxybutane.

Preferably, the unsaturated carboxylic acid can be acrylic (or methylacrylic) acid, maleic acid, butenic acid, iso-butenic acid, hexenic acid, phenyl acrylic acid, sorbic acid, maleic anhydride, fumaric acid, pentenedioic acid, itaconic acid or citric acid. Preferably, the alcohol can be methanol, ethanol, propanol, glycerol, ethanediol, phenylcarbinol, propylene glycol, cyclohexanol, diglycol, triglycol, polyethylene glycol, 1,4-butanediol, trihydroxy-metheyl-propane, barley sugar, sucrose, sorbol, sorbitan, mannose or glucose. Preferably, the polyether can be methoxypolyethylene glycol.

4) Sulphonate Containing Unsaturated Group:

Preferably, the sulphonate containing unsaturated group can be styryl sulfonic acid, vinyl sulfonic acid, allyl sulfonic acid, methyl-allyl sulfonic acid, methacrylamido-ethyl sulfonic acid, 2-acryloxy(or methacryloxy)-etheyl sulfonic acid, 3-acryloxy(or methacryloxy)-propyl-sulfonic acid, 3-acryloxy (or methacryloxy)-2-hydroxyl-propoxy sulfonic acid, 3-acryloxy(or methacryloxy)-2-hydroxylpropoxy-sulfophenyl ether, 3-acryloxy(or methacryloxy)-2-hydroxyl-propoxy-sulfo-benzoic acid, 4-acryloxy(or methacryloxy)-butyl sulfonic acid, acrylamido(or methacrylamido)-methyl sulfonic acid, acrylamido(or methacrylamido)-ethyl sulfonic acid, acrylamido(or methacrylamido)-2-methyl propane sulfdonic acid, or the ester, metal salt, ammonium salt, or amine salt thereof.

5) Unsaturated Amine or Unsaturated Amide:

The unsaturated amide ban be acrylamide or methacrylamide, N-hydroxy-acrylamide or methacrylamide, N,N-dimethyl-acrylamide or methacrylamide, acrylamido(or methacrylamido)-alkyl-amide, or unsaturated poly(alkyleneimine)monomer that is synthesized by poly(alkyleneimine) compound and unsaturated compound containing active group such as carboxylic acid, anhydride, glycidol ether, or halide containing active group.

The poly(alkyleneimine) compound is a random, alternat, or block addition product copolymerized by one or more types of N-heterocyclic compound of C2~C8, or copolymerized by N-heterocyclic compound and O-heterocyclic compound. Preferably, the N-heterocyclic compound can be azirine, aziridine, methyl-aziridine, or dimethyl-aziridine. Preferably, the O-heterocyclic compound can be ethylene oxide, propylene oxide, or butylene oxide.

6) Olefine:

The olefine can be monoolefine, dialkene, or polyene, and preferably, can be 1,3-butadiene, isoprene, cyclopentadiene, or styrene.

In one embodiment of the producing method of the present invention, in the step1, the reaction temperature is controlled at 1040° C. However, if the air temperature is low in winter, heat preservation of the vessel can be carried out or the reaction can be carried out in water bath.

In another embodiment of the producing method of the present invention, the weight ratio of the monomer, initiator, chain transfer agent and accelerant is 1:0.05~5%:0.01~5%:0~4%, particularly is 1:0.5~3%:0.03~3%:0~2%.

The initiation temperature, at which olenfine or dialkene is initiated to react, was divided into high temperature that's higher than 100° C., medium temperature that's 40~100° C., and low temperature that's 0~40° C. At present, the production of polycarboxylic acid water-reducing agent is mostly carried out at 40~100° C. However, the water-reducing agent can be synthesized at 0~40° C. using a redox system in the present invention. The heating of the reactants is unnecessary; however, the reactants can be melted or dissolved if they are solid and take up a large proportion, and then added into other reactants.

The purpose of the invention is the production of the high-performance polycarboxylic acid water-reducing agent by a most simple method, wherein, chain transfer agent, accelerant, and initiator form a redox system in order to reduce the activation energy of decomposition of the initiator to free radical, therefore, the decomposition of the initiator is accelerated and the polymerization can be carried out at low temperature, and the polymerization rate raises.

Surprisingly, there is no obvious exothermal phenomenon during the using the producing method of the polycarboxylic acid water-reducing agent of the present invention, so that it is easily to avoid the implosion due to the heat generated during polymerization. Therefore, the originality of the present invention is the needless of stirring and ability of the reaction at normal temperature, i.e. the needless of heating. Because of the gentle reaction conditions, the high-performance product can be produced under the primitive operation conditions, even in the packing cask such as 200 L or 1000 L plastic cask, or 50 or 100 steres storage tank, and the production capacity can be enlarged easily.

Compared with the conventional method, the producing method of the polycarboxylic acid water-reducing agent of the present invention cut down on 80% of the labors and 90% of the energy consumption. Because of needless of dropping the reactants and strictly controlling the temperature, the stir can be left out. So that the operation is greatly simplified, the controlling of the production is easier, and the pass yield of the product is higher. Furthermore, because of the low requirement for producing equipment, the production can be manufactured in a large scale in factory or in a small scale at construction site at any time.

DETAILED DESCRIPTION OF THE PREFERRED EMBODIMENTS

The purpose of the present invention is providing a new method of polycarboxylic acid water-reducing agent only needing simple production equipment, operation and low energy consumption. The method of the present invention overcomes the shortcomings of the conventional technologies, such as complex producing process, high energy consumption, difficulty of operation, and necessary of special equipment, etc. The present invention makes a breakthrough in the production of the polycarboxylic acid water-reducing agent, wherein, the high-performance polycarboxylic acid water-reducing agent is produced under non-stirring condition at the normal temperature. All the reactants such as comonomers and catalyst etc. are added rather than dropped, and the continuously stirring and heating or heat preservation is not necessary, so that the energy consumption is reduced. The present invention can be used for producing any known polycarboxylic acid water-reducing agent by any unsaturated monomer as raw material to get high-performance polycarboxylic acid water-reducing agent. Only by adding all the reactants proportionally and orderly, blending, keeping the reaction system standing for some time, and then adding alkaline liquor to neutralization, the high-performance polycarboxylic acid water-reducing agent product is obtained. Of course, appropriately stirring during the heat preservation is allowable if the stirring has not adverse effect on the product. The simple producing method of polycarboxylic acid water-reducing agent has not been reported.

There is no special restriction for the equipment used for producing the polycarboxylic acid water-reducing agent, and it can be free-shape vessel if there is no rustiness or active heavy metal ion such as copper ion.

The producing method of the polycarboxylic acid water-reducing agent of the present invention is one-step method. Generally, the reactants except initiator and neutralizer are added together into a reactor, and it needn't to consider the feed order because the added reactants can't react or react slowly. Then initiator is added, stirring to blending, and then keeping it standing to react. Or, all the reactants except neutralizer can be added together into a reactor if the reaction equipment and site condition have an ability of quickly feeding, stirring to blending, and then keeping it standing to react, and then the neutralizer is added to neutralization. Generally, the neutralizer is added at the end of the polymerization; however, it also can be added during the polymerization under the condition of that the pH value is controlled fewer than 6, because the half-life of free radical will be shorten and the reactants will react incompletely if pH value is too high.

In the producing method of the polycarboxylic acid water-reducing agent r of the present invention, it is not necessary to heat additionally and just keeping it standing for reaction at 0~50° C., and preferably, at 10~40° C. The weight ratio of the monomer, initiator, chain transfer agent and accelerant is 1:0.05~5%:0.01~5%:0~4%, and preferably, is 1:0.5~3%:0.03~3%:0~2%.

The present invention will be described referring to several embodiments, but the it is not intended to limit the invention to the specific embodiments illustrated.

EMBODIMENTS

Embodiment 1

The monomer is unsaturated carboxylic ester, the chain transfer agent is mercaptan, the initiator is persulfide, and the solvent is water.

Wherein, the unsaturated carboxylic ester is MPEG1000 methacrylate ester synthesized by the following method:

3.8 mole methacrylic acid and 1 mole Methoxy Polyethlene Glycol (MPEG) 1000 as main reactants, and p-benzenediol and p-hydroxyanisole as polymerization inhibitor are used for esterification catalyzed by concentrated sulfuric acid to get MPEG1000 methacrylate ester. After the esterification, the concentration is diluted by water to 82%, in this concentration the macromonomer can remain liquid state at normal temperature.

The chain transfer agent of mercaptan is thioglycollic acid and the initiator of persulfide is ammonium persulfate in this embodiment, as an example.

At room temperature, 232 portions of MPEG1000 methacrylate ester whose solid content is 82%, 650 portions of water and 4 portions of thioglycollic acid are added into a 1.5 L plastic reactor, stirring for 2 minutes.

93 portions of ammonium persulfate aqueous solution whose concentration is 10% are added, stirring for 5 minutes and keeping the reaction system standing to react for 6 hours.

Then alkaline liquor is added and stirred to neutralize until the pH value is about 7 to get the polycarboxylic acid water-reducing agent masterbatch which average molecular weight is about 45000 and which solid content is 20%.

Embodiment 2

The monomers are unsaturated carboxylic ester, unsaturated carboxylic acid, unsaturated amide, and sulfonate containing unsaturated group. Wherein, the unsaturated carboxylic ester is MPEG1000 methacrylate ester, the nsaturated carboxylic acid is methacrylic acid, the unsaturated amide is methacrylate amide, and the sulfonate is 2-acrylamido-2-methyl-propanesulfonic acid, as an example.

2.8 mole methacrylic acid and 1 mole MPEG1000 as main reactants, and p-benzenediol and p-hydroxyanisole as polymerization inhibitor are used for esterification catalyzed by concentrated sulfuric acid to get MPEG1000 methacrylate ester. After the esterification, the concentration is diluted by water to 82%, in this concentration the macromonomer can remain liquid state, at normal temperature.

At room temperature, 190 portions of MPEG methacrylate ester whose solid content is 82%, 650 portions of water, 30 portions of methacrylic acid, 1 portions of methacrylate amide, 10 portions of 2-acrylamido-2-methyl-propane-sulfonic acid are added into a 1.5 L plastic reactor and stirring for 2 minutes. Then 4 portions of thiohydracrylic acid are added and stirring for 2 minutes. Stopping the stirring, and 90 portions of ammonium persulfate aqueous solution which concentration is 10% are added and stirring for 5 minutes. Stopping the stirring and keeping the reaction system standing to react for 8 hours.

Then alkaline liquor is added and stirred to neutralize until the pH value is about 7 to get the polycarboxylic acid water-reducing agent r masterbatch which average molecular weight is about 36000 and which solid content is 20%.

Embodiment 3

The monomers are unsaturated polyether and unsaturated carboxylic acid such as isobutylene alcohol-polyoxyethylene

(50) ether and acrylic acid, the chain transfer agent is a mixture of two mercaptans such as thiohydracrylic acid and octyl mercaptan, and the accelerator is carboxylic acid such as glycine.

The isobutylene alcohol-polyoxyethylene (50) ether containing long chains and having a high molecular weight is solid monomer, so that, the monomer can be added into a solvent after melting or added into a solvent directly, and then stirring to be fully dissolved, in order to blend the reactants well.

At room temperature, 360 portions of isobutylene alcohol-polyoxyethylene (50) ether (solid plate), 550 portions of water are added into a 1.5 L plastic reactor and stirring to be dissolved. The isobutylene alcohol-polyoxyethylene (50) ether can be dissolved in a part of hot water, in order to get a quick dissolution, and when the isobutylene alcohol-polyoxyethylene (50) ether almost dissolves, other cold water is added and stirring.

35 portions of methacrylic acid, 3 portions of thiohydracrylic acid, 0.5 portions of octyl mercaptan, and 2 portions of glycine are added, stirring for 2 minutes. Then 90 portions of sodium persulfate aqueous solution which concentration is 10% are added and stirring for 5 minutes. Stopping the stirring and keeping the reaction system standing to react for 16 hours.

Then alkaline liquor is added and stirred to neutralize until the pH value is about 7 to get the polycarboxylic acid water-reducing agent masterbatch which average molecular weight is about 45000 and which solid content is 40%.

Embodiment 4

Unsaturated polyether is used as monomer such as 5-hexen-1-ol-polyoxyethylene (50) ether and 2-hydroxypropyl acrylate. The chain transfer agent is a mixture of mercaptans such as thiohydracrylic acid and octyl mercaptan. If the reaction time is too long, more than 20 hours for example, it is necessary to replenish initiator.

At room temperature, 360 portions of 5-hexen-1-ol-polyoxyethylene (50) ether (solid plate), 500 portions of water are added into a 1.5 L plastic reactor and stirring to be dissolved. The 5-hexen-1-ol-polyoxyethylene (50) ether can be dissolved in a part of hot water in order get a quick dissolution, and then other cold water is added when the solid almost dissolves, and stirring to blending.

30 portions of methacrylic acid, 5 portions of thiohydracrylic acid, 0.5 portions of octyl mercaptan, and 15 portions of triethanolamine fumarate which concentration is 60% are added, stirring for 2 minutes. Then 70 portions of sodium persulfate aqueous solution which concentration is 10% are added, and stirring for 5 minutes. Stopping the stir and keeping the reaction system standing to react for 20 hours, and then 10 portions of sodium persulfate aqueous solution are replenished, stirring for 5 minutes and reacting for 8 hours.

Then alkaline liquor is added and stirred to neutralize until the pH value is about 7 to get the polycarboxylic acid water-reducing agent masterbatch which average molecular weight is about 30000 and which solid content is 40%.

Embodiment 5

At room temperature, 500 portions of water are added into a 1.5 L plastic reactor. Under stirring condition, 300 portions of molten propenol-polyoxyethylene (50) ether which is solid wax and beforehand melted in 80~90° C. water bath are slowly added and stirring to be dissolved the water. Then 30 portions of methacrylic acid, 3.5 portions of thiohydracrylic acid, 0.5 portions of octyl mercaptan, 5 portions of glycery monoacrylate, and 80 portions of triethanolamine fumarate which concentration is 60% are added, and stirring for 2 minutes.

Then 75 portions of sodium persulfate aqueous solution which concentration is 10% are added and stirring for 5 minutes. Stopping the stir and keeping the reaction system standing to react for 20 hours, and then 15 portions of sodium persulfate aqueous solution is replenished, stirring for 5 minutes and reacting for 8 hours.

Then alkaline liquor is added and stirred to neutralize until the pH value is about 7 to get the polycarboxylic acid water-reducing agent masterbatch which average molecular weight is about 25000 and which solid content is 40%.

Embodiment 6

The monomers are unsaturated ester and unsaturated polyene-imide such as MPEG1000 methacrylate ester and unsaturated polyethyleneimine-EO macromer.

The unsaturated polyethyleneimine-EO macromer is synthesized by: polyethylenimine which molecular weight is about 600 is synthesized by aziridine, and then epoxyethane is added to the active hydrongen atom of the polyethylenimine to get the addition product of polyethyleneimine-EO. And glycidyl methacrylat is dropped to react with the amino group of the polyethyleneimine to get the unsaturated polyethyleneimine-EO macromer.

The MPEG1000 methacrylate ester is synthesized by: 4.0 mole methacrylic acid and 1 mole MPEG 1000 as main reactants, and p-benzenediol and p-hydroxyanisole as polymerization inhibitor are used for esterification catalyzed by concentrated sulfuric acid to get MPEG 1000 methacrylate ester. After the esterification, the concentration is diluted by water to 82%, in this concentration the macromonomer can remain liquid state.

At room temperature, 650 portions of water are added into a 1.5 L reactor, and 35 portions of unsaturated polyethyleneimine-EO macromer are added into the water. Then 190 portions of MPEG1000 methacrylate ester whose solid content is 82% are added. 5 portions of thiohydracrylic acid are added and stirring for 2 minutes. Then 90 portions of sodium persulfate aqueous solution which concentration is 10% are added and stirring for 5 minutes. Stopping the stir and keeping the reaction system standing to react for 8 hours.

Then alkaline liquor is added and stirred to neutralize until the pH value is about 7 to get the polycarboxylic acid water-reducing agent masterbatch which average molecular weight is about 25000 and which solid content is 20%.

Embodiment 7

MPEG1000 maleate is synthesized by the acidylation of maleic anhydride and MPEG1000 as main reactants catalyzed by toluene-p-sulfonic acid.

At room temperature, 350 portions of MPEG 1000 maleate and 500 portions of water are added into a 1.5 L plastic reactor and stirring to be dissolved completely. 65 portions of acrylic acid and 2 portions methacrylamide are added and stirring to blending. Then 5 portions of thiohydracrylic acid and 0.5 portions of octyl mercaptan are added and stirring for 2 minutes. Then 90 portions of sodium persulfate aqueous solution which concentration is 10% are added and stirring 5 minutes. Stopping the stir and keeping the reaction system standing to react for 20 hours.

Then alkaline liquor is added and stirred to neutralize until the pH value is about 7 to get the polycarboxylic acid water-reducing agent masterbatch which average molecular weight is about 25000 and which solid content is 40%.

The above-mentioned embodiments are only the illustration of the present invention, and the reagents, apparatus or operations that don't be detailed describe in these embodiments should be considered as the known reagents, apparatus or operations of the technical field.

The reaction temperature of the producing method of polycarboxylic acid water-reducing agent of the present invention is 0~50° C. and it is unnecessary to heat. If needed, the reaction system can be transferred into a solvent-removing equipment to remove the solvent to get high-performance polycarboxylic acid water-reducing agent product. The concentration of the product can be rectified according need, for example 5~80%.

And the monomer, initiator, accelerator, solvent, chain transfer agent or neutralizer can be selected according to the demand from the compounds following:

The solvent can be one or more of water, alcohol, aromatic hydrocarbon, aliphatic hydrocarbon, ester, or ketone. The neutralizer can be one or more of metal hydroxide, organic amine, or inorganic ammonia, and preferably can be one or more of sodium hydroxide, potassium hydroxide, aqueous ammonia, ethanolamine, triethanolamine.

The chain transfer agent can be one or more of mercaptan, halide, or unsaturated hydrocarbon, and preferably can be one or more of mercaptoacetic acid, mercaptoethanol, thioglycerol, thiohydroxyacetic acid, mercaptopropionic acid, 2-mercapto-propionic acid, 3-mercapto-propionic acid, thiomalic acid, 2-mercapto-ethyl sulfonic acid, butanethiol, octyl mercaptan, decyl mercaptan, lauryl mercaptan, hexadecyl mercaptan, octadecyl mercaptan, hexamethylene mercaptan, triophenol, octyl thiohydroxyacetate, octyl 2-mercaptopropionate, octyl 3-mercaptopropionate, 2-ethyl-hexyl mercaptopropionate, 2-mercapto-ethyl caprilate, 1,8-dimercapto-3,6-dioxo-octane, tri-thiol decane, laury mercapta, tetrachloromethane, tetrabromomethane, trichloromethane, dichloromethane, bromoform, bromo-trichloromethane, α-terpinene, γ-terpinene, dipentene, or terpinolene.

The accelerant can be one or more of reductant, organic amine, organic acid, alcohol, ketone, ester, ether, phenol, phosphide and organic phosphine, and preferably can be one or more of sodium bisulfite, sodium sulfite, ferrous sulfate, sodium thiosulfate, Mohr's salt, sodium metabisulfite, sodium hydrosulfite, sodium formaldehyde sulfoxylate, ascorbic acid, sodium ascorbate, phosphoric acid or phosphate salt, phosphorous acid or phosphate salt, hypophosphorous acid or hypophosphite salt, ethanediamine, sodium ethylene diamine tetracetate, phenothiazine, hydroxyethylidenediphosphonic acid, amino trimethylene phosphonic acid, polyamino polyether methylene phosphonate, hexamethylendiamino tetramethylene phosphonic acid, glycine, lactic acid, 2-hydroxyl-phosphono-acetic acid, poly (aspartic acid), polyepoxysuccinic acid, phytic acid, 2-amino-1-propanol, 2-amino-1,3-ropanediol, isopropanol, turpentine, cyclohexanone, p-hydroxylbenzoic acid, p-(t-butyl)-phenyl methyl ether, 2,6-di(t-butyl)-p-cresol, p-hydroxylphenyl methyl ether, 2,5-di(t-butyl)-p-benzenediol, p-benzenediol, p-(t-butyl)-o-dihydroxybenzene, or (t-butyl)-p-benzenediol.

The initiator can be one or more of peroxide, persulfide or azoic compound, and preferably can be one or more of sodium persulfate, potassium persulfate, ammonium persulfate, hydrogen peroxide, benzoyl peroxide, lauroyl peroxide, cumene hydroperoxide, azo-di(2-methyl)-propanamide hydrochloride, 2,2'-azo-di(2-methyl-propanamide)-oxime salt, azobisisobutyronitrile or azobisisobutyroamidine hydrochlorate.

The monomers can be one or more of unsaturated polyether, unsaturated carboxylic acid or its salt, unsaturated ester, unsaturated amine, unsaturated amide, sulphonate containing unsaturated group, or olefine.

The molecular structure of the unsaturated polyether is:

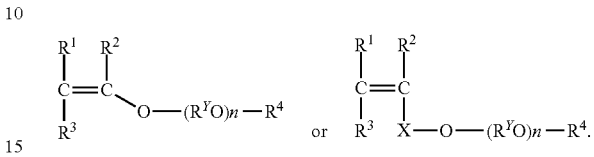

Wherein, $R^1$, $R^2$, or $R^3$ can be H or alkyl, $R^4$ can be H or hydrocarbyl of C1~C20, $R^Y$ can be hydrocarbonyl of C2~C18, X can be divalence chain olefin of C1-C5, and n can be the integer among 1~300. The unsaturated polyether is synthesized by the following method: the alcohol containing unsaturated bond at a end thereof reacts with the monomer of oxyalkylene with catalyst present, and the product is terminated by hydroxyl, alkyl or alkenyl, wherein the alcohol containing unsaturated bond at a end thereof can be vinyl alcohol, butynol, Decynediol, or the alcohol as shown by the following structure:

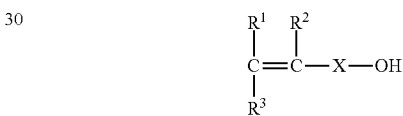

Wherein, R is alkyl with or without branched chain, and preferably the alcohol is allyl alcohol, methyl-allyl alcohol, butenol, 1,2-dimethylo-2-propen-1-ol, 1-methyl-1-butene-1-ol, 2-methyl-3-butene-1-ol, 2-methyl-2-butene-1-ol, 3-methyl-3-butene-1-ol, 5-hexen-1-ol, heptenol, or nonenol. The —$(R^YO)_n$— is synthesized by random, alternat, or block addition by one or more type of oxyalkylene having the following structure:

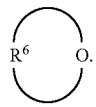

Wherein, $R^6$ can be alkyl with or without branched chain, and preferably, the oxyalkylene is ethylene epoxide, propylene epoxide, 1,4-epoxybutane, isobutylene oxide, 1,2-epoxybutane, or 2,3-epoxybutane.

The unsaturated carboxylic acid or its salt can be one or more of fatty acid, polybasic acid, or acid anhydride with C2~C20, or the salt thereof, and preferably, the unsaturated carboxylic acid or its salt can be one or more of acrylic acid, methacrylic acid, butenic acid, iso-butenic acid, hexenic acid, phenyl acrylic acid, sorbic acid, maleic acid, maleic anhydride, fumaric acid, glutaconic acid, itaconic acid, citric acid, or the their metal salt, ammonium salt, or amine salt, such as triethanolamine acrylate, triethanolamine methacrylate.

The unsaturated ester can be total ester or hemiester synthesized by unsaturated carboxylic acid containing one or more carboxyls and alcohol which is single-alcohol or polybasic alcohol, or polyether having the structural formula of $R^9$-T-$(R^ZO)_k$H; wherein $R^9$ is H or hydrocarbonyl of C1~C20, T is N, O, or OO, $R^ZO$ is the random, alternat, or block addition product by one or more types of oxyalkylene, k is an integer among 1~300. Preferably, the oxyalkylene is ethylene epoxide, propylene epoxide, 1,4-epoxybutane, isobutylene oxide, 1,2-epoxybutane, 2,3-epoxybutane, or styrene oxide; the unsaturated carboxylic acid is acrylic acid or methacrylic acid, maleic acid, butenic acid, iso-butenic acid, hexenic acid, phenyl acrylic acid, sorbic acid, maleic anhydride, fumaric acid, glutaconic acid, itaconic acid, or citric acid; the alcohol is methanol, ethanol, propanol, glycerol, ethanediol, phenylcarbinol, propylene glycol, cyclohexanol, diglycol, triglycol, polyethylene glycol, 1,4-butanediol, trihydroxy-methyl-propane, malt sugar, sorbol, sorbitan, mannose, sucrose, or glucose; the polyether is methoxypolyethylene glycol.

Preferably, the sulphonate containing unsaturated group is vinyl sulfonic acid, styryl sulfonic acid, allyl sulfonic acid, methylallyl sulfonic acid, methacrylamido-ethyl sulfonic acid, 2-acroloyl (or methacroloyl)-ethyl sulfonic acid, 3-acroloyl(or methacroloyl)-propyl-sulfonic acid, 3-acroloyl(or methacroloyl)-2-hydroxyl-propoxy sulfonic acid, 3-acroloyl (or methacroloyl)-2-hydroxylpropoxy-sulfo-phenyl ether, 3-acroloyl(or methacroloyl)-2-hydroxyl-propoxy-sulfo-benzoic acid, 4-acroloyl(or methacroloyl)-butyl sulfonic acid, acrylamido(or methacrylamido)-methyl sulfonic acid, acrylamido(or methacrylamido)-ethyl sulfonic acid, acrylamido (or methacrylamido)-2-methyl propane suldonic acid, or one of their esters, metal salt, ammonium salt, or amine salt.

The unsaturated amine or unsaturated amide can be acrylamide (or methacrylamide), N-hydroxy-acrylamide (or methacrylamide), N,N-dimethyl-acrylamide (or methacrylamide), acroloyl(or methacroloyl)-alkyl-amide, or unsaturated poly(alkyleneinines) synthesized by poly(alkyleneinines) compound and unsaturated compound containing active group such as carboxylic acid, anhydride, halide, or glycidol ether containing active group.

Preferably, the poly(alkyleneinines) compound is the random, alternat, or block addition product copolymerized by one or more types of N-heterocyclic compound of C2~C8, or copolymerized by N-heterocyclic compound and O-heterocyclic compound. And preferably, the N-heterocyclic compound is azirine, aziridine, methyl-aziridine or dimethyl-aziridine; the O-heterocyclic compound is epoxy ethane, epoxy propane, or epoxy butane.

The olefine can be monoolefine, dialkene, or polyene, and preferably, the olefine is 1,3-butadiene, isoprene, cyclopentadiene, or styrene.

Contrasts

The polycarboxylic acid water-reducing agent is also produced by conventional methods to compare with the polycarboxylic acid water-reducing agent produced by the method of the present invention.

Contrast 1:

Synthesis of MPEG1000 methacrylate ester: 3.8 mole methacrylic acid and 1 mole MPEG1000 as main reactants and p-benzenediol and p-methoxyphenol as polymerization inhibitors are used for esterification catalyzed by concentrated sulfuric acid to get MPEG1000 methacrylate ester. After the esterification, the concentration is diluted by water to 82%, in this concentration the macromonomer can remain liquid state.

The polycarboxylic acid water-reducing agent is produced using equipment containing constant velocity stirrer and heating apparatus. 240 portions of MPEG1000 methacrylate ester whose solid content is 82% and 176 portions of water is stirred to blending, and then loaded in a constant pressure funnel to be used as material A; and 5 portions of ammonium persulfate and 152 portions of water are stirred to blending, and then loaded in a constant pressure funnel to be used as material B.

In a 1000 ml glass flask, 380 portions of water are added and heated to 90±3° C. under stirring conditions. Material A and B are dropped simultaneously, wherein, the dropping time of material A is 3 hours and the dropping time of material B is 3.5 hours, and the dropping should be controlled at constant velocity. After the dropping, heat preservation is carried out for curing for 1 hours at 90±3° C.

Cooling down to 60° C. or lower, alkaline liquor is added and stirred to neutralize until the pH value is about 7 to get the polycarboxylic acid water-reducing agent masterbatch which average molecular weight is about 45000 and which solid content is 20%.

Contrast 2:

Synthesis of MPEG1000 methacrylate ester: 2.8 mole-acrylic acid and 1 mole MPEG1000 as main reactants and p-benzenediol and p-hydroxyanisole as polymerization inhibitors are used for esterification catalyzed by concentrated sulfuric acid to get MPEG1000 methacrylate ester. After the esterification, the concentration is diluted by water to 82%, in this concentration the macromonomer can remain liquid state.

The polycarboxyl based superplasticizer is produced using equipment containing constant velocity stirrer and heating apparatus. 190 portions of MPEG1000 methacrylate ester whose solid content is 82% and 185 portions of water is stirred to blending, and 30 portions of methacrylic acid, 10 portions of 2-acrylamido-2-methyl-propanesulfonic acid, 1 portions of methacrylmide are added and stirred to blending, and then loaded in a constant pressure funnel to be used as material A; and 5 portions of ammonium persulfate and 152 portions of water are stirred to blending, and then loaded in a constant pressure funnel to be used as material B.

In a 1000 ml glass flask, 380 portions of water are added and heated to 90±3° C. under stirring conditions. Material A and B are dropped simultaneously, wherein, the dropping time of material A is 3 hours and the dropping time of material B is 3.5 hours, and the dropping should be controlled at constant velocity. After the dropping, heat preservation is carried out for curing for 1 hours at 90±3° C.

Cooling down to 60° C. or lower, alkaline liquor is added and stirred to neutralize until the pH value is about 7 to get the polycarboxylic acid water-reducing agent masterbatch which average molecular weight is about 35000 and which solid content is 20%.

Results:

The water-reducing agents produced by the above-mentioned embodiments and Contrasts are used for preparing concrete to comparison.

(1) Cement Paste Fluidity:

Table 1 gives the material proportion in the measurement of the cement paste fluidity, and the equipment used in the measurement of the cement paste fluidity is normal cement paste mixer operated by conventional method.

TABLE 1

Material proportion in the measurement of the cement paste fluidity

|  | Cement PO42.5 | water | water-reducing agent (20% concentration) | water-reducing agent (40% concentration) |
|---|---|---|---|---|
| Weight/g | 300 | 85 | 2.6 |  |
| Weight/g | 300 | 85 |  | 1.3 |

TABLE 2

Comparison of the cement paste fluidity

| water-reducing agent | cement paste fluidity/mm | |
|---|---|---|
| | Initial fluidity | fluidity after 1 hour |
| embodiment 1 | 233 | 204 |
| embodiment 2 | 200 | 161 |
| embodiment 3 | 255 | 235 |
| embodiment 4 | 213 | 194 |
| embodiment 5 | 204 | 172 |
| embodiment 6 | 266 | 242 |
| embodiment 7 | 200 | 154 |
| contrast 1 | 242 | 220 |
| contrast 2 | 216 | 182 |

The water-reducing agent in the embodiment 1 is produced by the method of the present invention under non-stir condition at normal temperature, and the water-reducing agent in contrast 1 is produced by conventional method using dropping and thermal polymerization. The reactants used in the two methods are almost same, and there is no statistical diversity between their cement paste fluidity.

The water-reducing agent in the embodiment 2 is produced by the method of the present invention under non-stir condition at normal temperature, and the water-reducing agent in contrast 2 is produced by conventional method using dropping and thermal polymerization. The reactants used in the two methods are almost same, and there is no statistical diversity between their cement paste fluidity.

(2) Cement Mortar Fluidity:

The equipment used for the measurement of the cement mortar fluidity is normal cement mortar mixer. There is a similarity between the measurement of the cement paste and the cement mortar, and the repeatability of the measurement of the cement mortar is good.

Materials:
Cement PO42.5: Bought from Jidong Development Group Co., Lid.
Medium sand: filtered by a filter screen of 5 mm aperture after drying to remove pebbles and other impurities, and after mixing, separated into small packing of 750 g, and then placed in a sealed container to be used.
Material proportion: shown in Table 3.
Equipment: cement mortar mixer and cement vibrating table.

750 g medium sand is added into the hopper of the cement mortar mixer and 300 g cement is added into the agitator. Water and polycarboxylic acid water-reducing agent are weighed proportionally and added into the agitator kettle. Setting the agitator kettle, switching on the cement mortar mixer, and the completing automatically an operation process consisting of 30 seconds at low velocity~~another 30 seconds at low velocity during which the adding of the material is completed~~30 seconds at high velocity~~stopping for 90 seconds~~60 seconds at high velocity at the end. The whole process needs 240 seconds in all.

The mortar is took out from the agitator kettle and placed into a round die on the table-board of the cement vibrating table. Holding down the die sleeve and tamping the mortar by a ramming bar along with the circumference of the round die to densify. Taking away the sleeve and removing the mortar higher the round die. The die is raised vertically and carefully and is removed. Immediately, pressing the start button of the counter, a cycle consisting of 25 times vibration of the vibrating table is carried out. The dates of the Initial fluidity of the cement mortar are measured by a rule.

The mortar is sealed in a container, and 1 hour later added into the agitator kettle, stirring speedy for 2 minutes. The mortar is took out from the agitator kettle and placed into a round die on the table-board of the cement vibrating table. Holding down the die sleeve and tamping the mortar by a ramming bar along with the circumference of the round die to densify. Taking away the sleeve and removing the mortar higher the round die. The die is raised vertically and carefully and is removed. Immediately, pressing the start button of the counter, a cycle consisting of 25 times vibration of the vibrating table is carried out. The dates of the fluidity after 1 hour of the cement mortar are measured by a rule.

TABLE 3

Weight ratio of the materials

| | cement PO42.5 | medium sand | water | water-reducing agent (20% concentration) | water-reducing agent (40% concentration) |
|---|---|---|---|---|---|
| Weight/g | 300 | 750 | 125 | 2.6 | |
| Weight/g | 300 | 750 | 125 | | 1.3 |

TABLE 4

Cement mortar fluidity

| water-reducing agent | cement motar fluidity/mm | |
|---|---|---|
| | Initial fluidity | fluidity after 1 hour |
| embodiment 1 | 248 | 211 |
| embodiment 2 | 216 | 182 |
| Ambodiment 3 | 259 | 226 |
| Ambodiment 4 | 218 | 195 |
| embodiment 5 | 215 | 196 |
| embodiment 6 | 262 | 235 |
| embodiment 7 | 203 | 175 |
| contrast 1 | 250 | 207 |
| contrast 2 | 210 | 186 |

The water-reducing agent in the embodiment 1 is produced by the method of the present invention under non-stir condition at normal temperature, and the water-reducing agent in contrast 1 is produced by conventional method using dropping and thermal polymerization. The reactants used in the two methods are almost same, and there is no statistical diversity between their cement mortar fluidity.

The water-reducing agent in the embodiment 2 is produced by the method of the present invention under non-stir condition at normal temperature, and the water-reducing agent in contrast 2 is produced by conventional method using dropping and thermal polymerization. The reactants used in the two methods are almost same, and there is no statistical diversity between their cement mortar fluidity.

From the results, it can be seen that the water-reducing agents produced by the two methods have the almost same performances. However, it is not necessary to heat and strictly controlling in the present invention, so that the process is greatly simplified.

It should be appreciated that the description of the embodiments above is only the illustrations of the present invention, and the scope of the present invention should not be limit by the specific embodiments illustrated. Numerous other ways of carrying out the method provided by the present invention may be devised by a person skilled in the art without departing from the scope of the invention, and are thus encompassed by the present invention. So that it should be understood that any identical shifting can be done without departing from the scope of the present invention.

The invention claimed is:

1. A producing method of polycarboxylic acid water-reducing agent characterized in that the method includes the following steps:
   the chain transfer agent, accelerant and initiator and the monomers are dissolved in a solvent, wherein, the chain transfer agent and accelerant composes a redox system, then are kept standing for polymerizing at 0 to 50° C. after uniform mixing;
   neutralize by adding a neutralizer to ending the reaction, wherein the chain transfer agent is one or more of the mercaptan, halide, or unsaturated hydrocarbon,
   the accelerant is one or more of reductant, alcohol, ketone, ester, ether, phenol, inorganic phosphide, organic phosphine, organic amine or organic carboxylic acid,
   the solvent is one or more of water, alcohol, aromatic hydrocarbon, aliphatic hydrocarbon, ester or ketone,
   the neutralizer is one or more of metal hydroxide, organic amine or inorganic ammonia, the initiator is one or more of peroxide, persulfide or azoic compound, and the monomers are unsaturated organic compounds.

2. A method according claim 1 characterized in that, the feeding sequence is: the monomers with higher molecular weight are dissolved first, and then the monomers with lower weight, chain transfer agent and accelerant are added into the solvent, stirring to homogenization and then an initiator is added.

3. A method according claim 1 characterized in that, the feeding sequence is: the monomers, chain transfer agent and accelerant are added at the same time, stirring and then the initiator is added.

4. A method according claim 1 characterized in that the weight ratio of the monomers, initiator, chain transfer agent and accelerant is 1:0.05 to 5%:0.01~5%:0 to 4%.

5. A method according claim 4 characterized in that the weight ratio of the monomers, initiator, chain transfer agent and accelerant is 1:0.5 to 3%:0.03 to 3%:0 to 2%.

6. A method according claim 1 characterized in that, the polymerization temperature is 10 to 40° C.

7. A method according claim 1 characterized in that, removing the solvent in the product by solvent-removing equipment.

8. A method according claim 1 characterized in that, the unsaturated compound is one or more of unsaturated polyether, unsaturated carboxylic acid or its salt, unsaturated ester, unsaturated amine, unsaturated amide, sulphonate containing unsaturated group, and olefin.

9. A method according claim 8 characterized in that, the unsaturated carboxylic acid or its salt is one or more of unsaturated fatty acid of C2 to C20, or polybasic acid, or their salt or anhydride.

10. A method according claim 8 characterized in that, the unsaturated ester is total ester or hemiester synthesized by unsaturated carboxylic acid containing one or more carboxyls and alcohol which is single-alcohol or polybasic alcohol, or polyether shown by the structural formula of $R^9\text{-}T\text{-}(R^ZO)_k\text{---}H$;
   wherein, $R^9$ is H or hydrocarbyl of C1 to C20, T is N, O, or OO, $R^Z$ is a random, alternat or block addition product consisted by one or more kinds of oxyalkylenes, k is an integer among 1 to 300.

11. A method according claim 8 characterized in that, the olefin is monoolefine, dialkene, or polyene hydrocarbon.

12. A method according claim 8 characterized in that, the structural formula of the unsaturated polyether is:

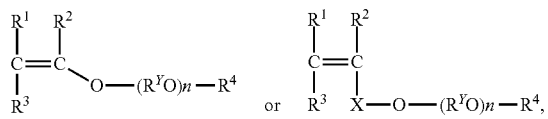

wherein, $R^1$, $R^2$, or $R^3$ is H or alkyl, $R^4$ is H or hydrocarbyl of C1 to C20, $R^Y$ is hydrocarbyl of C2 to C18, X is divalence chain olefin of C1 to C5, n is an integer among 1 to 300.

13. A method according claim 12 characterized in that the $\text{---}(R^YO)_n\text{---}$ is the random, alternate or block addition product consisted by one or more types of oxyalkylene.

14. A method according claim 13 characterized in that, the structural formula of oxyalkylene is:

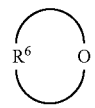

wherein, $R^6$ is alkyl with or without branch.

15. A method according claim 8 characterized in that, the unsaturated amide includes the unsaturated poly(alkylenimine)mononer.

16. A method according claim 15 characterized in that, the unsaturated poly(alkylenimine)mononer is synthesized by the reaction of poly(alkylenimine) compound and unsaturated compound with active groups.

17. A method according claim 16 characterized in that, the unsaturated compound with active groups is acid, anhydride, glycidol ether, or halide.

18. A method according claim 16 characterized in that, the poly(alkylenimine) compound is the random, alternat, or block addition product synthesized by N-heterocyclic compound of C2 to C8.

19. A method according claim 16 characterized in that the poly(alkylenimine) compound is obtained by random, alternat, or block copolymerization by N-heterocyclic compound and O-heterocyclic compound.

* * * * *